United States Patent
Ducourant et al.

(12)

(10) Patent No.: US 6,686,959 B1
(45) Date of Patent: Feb. 3, 2004

(54) METHOD FOR CONTROLLING A PHOTOSENSITIVE DEVICE WITH LOW IMAGE RETENTION, AND PHOTOSENSITIVE DEVICE IMPLEMENTING SAME

(75) Inventors: Thierry Ducourant, Voiron (FR); Christophe Chaussat, St Nizier (FR)

(73) Assignee: Thomson Tubes Electroniques, Meudon la Foret (FR)

( * ) Notice: Subject to any disclaimer, the term of this patent is extended or adjusted under 35 U.S.C. 154(b) by 0 days.

(21) Appl. No.: 09/367,869

(22) PCT Filed: Mar. 6, 1998

(86) PCT No.: PCT/FR98/00450

§ 371 (c)(1),
(2), (4) Date: Sep. 3, 1999

(87) PCT Pub. No.: WO98/41010

PCT Pub. Date: Sep. 17, 1998

(30) Foreign Application Priority Data

Mar. 7, 1997 (FR) .............................................. 97 02752

(51) Int. Cl.⁷ .............................................. H04N 5/217
(52) U.S. Cl. ...................................... 348/241; 348/308
(58) Field of Search .............................. 348/294, 308, 348/241, 243

(56) References Cited

U.S. PATENT DOCUMENTS

| | | | | |
|---|---|---|---|---|
| 4,797,546 A | * | 1/1989 | Berger et al. | 348/294 |
| 4,797,560 A | * | 1/1989 | Berger et al. | 348/309 |
| 4,827,145 A | * | 5/1989 | Arques | 348/310 |
| 4,948,966 A | * | 8/1990 | Arques et al. | 348/294 |
| 5,003,167 A | * | 3/1991 | Arques | 250/208.1 |
| 5,093,576 A | * | 3/1992 | Edmond et al. | 257/459 |
| 5,225,706 A | * | 7/1993 | Berger et al. | 257/459 |
| 5,352,884 A | * | 10/1994 | Petrick et al. | 348/308 |
| 5,523,554 A | * | 6/1996 | Hassler et al. | 348/294 |
| 5,572,257 A | * | 11/1996 | Conrads et al. | 348/308 |
| 5,608,205 A | * | 3/1997 | Bird et al. | 348/311 |
| 5,777,495 A | | 7/1998 | Arques et al. | |
| 6,265,737 B1 | | 7/2001 | Ducourant | |

* cited by examiner

Primary Examiner—Vu Le
Assistant Examiner—Jason Whipkey
(74) Attorney, Agent, or Firm—Oblon, Spivak, McClelland, Maier & Neustadt, P.C.

(57) ABSTRACT

A drive process for an array of photosensitive points produced on a semiconductor material. Each of the points has a photodiode connected in series with a switch element. The photodiode is reverse-biased and produces charges when it is exposed to a light signal during an imaging phase. Before the imaging phase, the photosensitive points are illuminated with an additional light flux whose intensity causes the photodiode to conduct in the forward direction and then in applying a biasing pulse to the photosensitive points in order to return the photodiode to reverse bias. Thus, a current is produced which has the effect of reducing a remanence effect in the semiconductor material.

24 Claims, 3 Drawing Sheets

METHOD FOR CONTROLLING A PHOTOSENSITIVE DEVICE WITH LOW IMAGE RETENTION, AND PHOTOSENSITIVE DEVICE IMPLEMENTING SAME

BACKGROUND OF THE INVENTION

The present invention relates to a drive process for photosensitive devices having a matrix of photosensitive points, of the type which are in particular produced by deposition techniques for semiconductor materials, and its object is to reduce or eliminate the remanence effect occurring in the photosensitive points. The invention relates more particularly (but not exclusively) to the driving of such devices which are used for the detection of radiological images. It also relates to a photosensitive device for implementing this process.

DISCUSSION OF THE BACKGROUND

The techniques for thin-film deposition of semiconductor materials such as hydrogenated amorphous silicon (aSiH) on insulating substrates, for example glass, make it possible to obtain matrices of photosensitive points which can produce an image from visible or near-visible radiation. In order to use these matrices for the detection of radiological images, it is sufficient to interpose a scintillator screen, between the X-radiation and the matrix, to convert the X-radiation to light radiation in the band of wavelengths to which the photosensitive points are sensitive.

The photosensitive points which form these matrices generally comprise a photosensitive element combined with an element fulfilling a switch function.

The photosensitive element commonly consists of a diode, connected in series with the switch element. The switch element may for example be a so-called switching diode whose "closed" or "on" state corresponds to the biasing which sets it in forward conduction, and whose "open" or "off" state corresponds to its reverse biasing. The two diodes are connected with opposite conduction directions, with a so-called "head-to-tail" configuration. Such an arrangement is well-known, in particular from French Patent Application 86 14058 (Publication No. 2 605 166) which describes a matrix of photosensitive points of the type with two diodes in "head-to-tail" configuration, a process for reading the photosensitive points, and a way of producing such a photosensitive device.

FIG. 1 represents a simplified diagram of a photosensitive device, having a conventionally organized matrix 2. The matrix 2 has photosensitive points P1 to P9, which are each formed by a photosensitive diode Dp and a switching diode Dc that are connected in series with a head-to-tail configuration. The matrix has row conductors Y1 to Y3 intersecting with column conductors X1 to X3 with, at each intersection, a photosensitive point connected between a row conductor and a column conductor. The photosensitive points P1 to P9 are thus arranged along rows L1 to L3 and columns CL1 to CL3.

In the example in FIG. 1, only 3 rows and 3 columns are represented, which define nine photosensitive points, but such a matrix may have a much larger capacity, which may be as much as several million points. It is common, for example, to produce such matrices having photosensitive points arranged along 2000 rows and 2000 columns (in an area of the order of 40 cm×40 cm), or alternatively arranged along a single line and a plurality of columns in order to form a linear detection array, or else arranged along a single row and a single column in order to form a single photosensitive point.

The photosensitive device has a row drive circuit 3 whose outputs SY1, SY2, SY3 are respectively connected to the row conductors Y1, Y2, Y3. The row drive circuit 3 has various elements (not shown) such as, for example, a clock circuit, switching circuits, and a shift register, which allow it to address the row conductors Y1 to Y3 sequentially. The photosensitive device furthermore has a voltage source 4, supplying the row drive circuit 3 with a voltage VP used to define the amplitude of pulses applied to the row conductors.

In each photosensitive point P1 to P9, the two diodes Dp, Dc are connected together either via their anode, or via their cathode as in the example represented. The anode of the photodiode Dp is connected to a column conductor X1 to X3, and the anode of the switching diode Dc is connected to a row conductor Y1 to Y3.

In the image-acquisition or imaging phase, that is to say the phase of illuminating the matrix 2 with a so-called "working" light signal, the two diodes Dp, Dc of each photosensitive point P1 to P9 are reverse-biased, and in this state they each constitute a capacitor. It should be noted that the two diodes Dp, Dc are generally designed so that the capacitance exhibited by the photodiode Dp is the larger (by of the order of, for example, 50 times).

During the exposure to a working light signal, the charges are generated in the photodiode Dp by the illumination of the photosensitive point P1 to P9 to which it belongs. These charges, the quantity of which depends on the illumination intensity, accumulate at a point "A" on the (floating) node formed at the junction point of the two diodes Dp, Dc. The photosensitive points P1 to P9 are read row by row, simultaneously for all the photosensitive points connected to a given row conductor Y1 to Y3. To that end, the row drive circuit 3 applies a so-called reading pulse of a given amplitude to each row conductor Y1 to Y3 addressed; the row conductors which are not being addressed are kept at a reference potential Vr or standby potential, which is for example earth, and which may be the same potential as that which is applied to the column conductors X1 to X3.

The possible accumulation of charges at the point "A" of a photosensitive point P1 to P9 leads to a reduction in the voltage at this point, that is to say a reduction in the reverse-bias voltage of the photodiode Dp. With certain operating modes, the application of the reading pulse to a row conductor Y1 to Y3 has the effect of restoring, to the potential of the point "A" of all the photosensitive points connected to this row conductor, the biasing level which it had before exposure to the working light signal: this results in a current proportional to the charges accumulated at the corresponding point "A" flowing in each of the column conductors X1 to X3.

The column conductors X1 to X3 are connected to a reading circuit CL, in the example comprising an integrator circuit 5, and a multiplexer circuit 6 which is formed, for example, by a shift register with parallel inputs and series output which may be of the CCD type (charge coupled device). Each column conductor is connected to a negative input "−" of an amplifier G1 to G3 connected as an integrator. An integration capacitor C1 to C3 is connected between the negative input "−" and an output S1 to S3 of each amplifier. The second input "+" of each amplifier G1 to G3 is connected to a potential which, in the example, is the reference potential Vr, which potential is consequently imposed on all the column conductors X1 to X3. Each amplifier has a so-called resetting switch element I1 to I3 (consisting for example of a MOS-type transistor), connected in parallel with each integration capacitor C1 to C3.

The outputs S1 to S3 of the amplifiers are connected to the inputs E1 to E3 of the multiplexer 6. This conventional arrangement makes it possible to deliver "in series" and row after row (L1 to L3) at the output SM of the multiplexer 6, signals which correspond to the charges accumulated at the points "A" of all the photosensitive points P1 to P9.

It should be noted that it is also known, in order to fulfil the switch function which, in the example in FIG. 1, is held by the switching diode Dc, to use a transistor; compared with a diode, the latter involves more complicated connection, but provides advantages in the quality of its "on" state, which advantages will be explained in the description below.

FIG. 2 schematically illustrates a photosensitive device 1' which differs from the one in FIG. 1 principally in that it has a matrix 20 in which the switching diodes Dc are replaced by transistors T which are also produced by thin-film deposition techniques (TFTs).

In the diagram shown by way of example in FIG. 2, at each photosensitive point P1 to P9 the transistor T is connected via its source S to the cathode of the photodiode Dp, that is to say to the point "A", its gate G is connected to the row conductor Y1 to Y3 to which the photosensitive point belongs, and its drain D is connected to the column conductor X1 to X3 to which the photosensitive point belongs. The anodes of all the photodiodes Dp are joined and connected to an output SP4 of the row drive circuit 3. The output SP4 delivers a so-called bias voltage VpL which is negative relative to the reference potential VR or earth, for example by of the order of -5 volts, and which is used to form the reverse-bias of the photodiodes Dp; the row drive circuit 3 receives this bias voltage, for example, from a supply source 4'.

In this configuration, the row drive circuit 3 delivers, via its outputs SY1 to SY3, signals or pulses with the same synchronization as in the case of FIG. 1, which signals simultaneously set all the transistors T of a given row L1 to L3 in the "on" state. At each photosensitive point, putting a transistor T in the "on" state causes the reference voltage VR to be applied to the cathode of the photodiode Dp: this results, in a manner which is well-known per se, either in initial reverse-biasing of the photodiode (in preparation for an imaging phase)l; or restoring initial reverse-biasing (during a reading phase), with the flow through the column conductors X1 to X3 of a current representing the quantity of charges which are accumulated in the photosensitive points P1 to P9 belonging to the row L1 to L3 addressed. The rest of the operation is similar to that already explained.

The proportionality between the value delivered at the output of the multiplexer 6 and the intensity of the working light signal picked up by a photosensitive point may be distorted for various reasons, among which remanence phenomena are particularly problematic, in particular because they can introduce, when measuring the illumination of a photosensitive point after imaging, a correlation with the illumination of the same photosensitive point during previous imaging.

The greatest cause of remanence in the case of matrices whose photosensitive points are produced from semiconductor materials, and even more particularly in the case of amorphous silicon (aSi), essentially resides in a high density of deep states in the forbidden band of the material: in the case, for example, of amorphous silicon, the lack of a crystal lattice creates traps which can retain charges that are generated during imaging. Under these conditions, the semiconductor material can to some extent "remember" an image corresponding to a given illumination process, and return charges relating to an image during the reading of a subsequent image, or even several subsequent images.

SUMMARY OF THE INVENTION

With a view to reducing or even eliminating the remanence defect mentioned above, the invention proposes to produce a current making it possible to fill or saturate the traps (or deep states) present in the structure of the semiconductor material, so that these traps become emptied with a statistic which no longer has anything to do with the previous image, which results in a complete absence of correlation and therefore an absence of remanence.

The invention therefore relates to a drive process for a photosensitive device having a matrix of photosensitive points, the photosensitive points being arranged in at least one row and in at least one column and each comprising a switch element in series with a photodiode, the process consisting, on the one hand, in exposing the matrix to a so-called working light signal during an imaging phase, during which charges produced in each photosensitive point according to its exposure modify a bias voltage of the photodiode, and consisting on the other hand in reading the photosensitive points in a reading phase which takes place after the imaging phase, the said process being characterized in that it furthermore consists, at least once before the imaging phase, in firstly exposing the matrix to a so-called erasing light flux having an intensity such that it causes conduction in the forward direction by each photodiode, and in secondly reverse-biasing all the photodiodes.

It should be noted that the process of the invention furthermore makes it possible, straightforwardly, to improve the efficiency with which the photosensitive points are read, particularly when the charges which are accumulated therein have low value. One solution to this problem is known from French Patent Application No. 88 12126 published with the No. 2 636 800. This solution applies to the case in which the photosensitive points each consist of a photodiode connected in series with a diode fulfilling the function of a switch element, and with the two diodes connected in a head-to-tail configuration, as in the example in FIG. 1.

This patent application proposes to create, by additional illumination, so-called drive charges which are added at each photosensitive point to the "signal" charges produced by the exposure to the working light signal. This additional illumination can be obtained by various types of light source, for example a lumiplate or an array of light-emitting diodes, as described in a French Patent Application No. 2 598 250.

Referring again to FIG. 1, if the matrix 2 is produced on an insulating substrate 7 (represented by a solid line) which is transparent to light, for example made of glass or quartz as described in the Application No. 2 605 166 cited above, an additional light source SL (symbolized by a dotted line) may be placed against the substrate 7, on the opposite side from the matrix 1 so as not to form a screen against the working light signal. For example, assuming that the substrate 7 lies in a plane which is the same as that of the figure, the light source SL lies in a plane which is deeper than that of the figure. Of course, the device in FIG. 2 may itself also have such an additional light source (not shown in FIG. 2).

The drive charges added to the charges which are created by the working light signal make it possible to minimize the detrimental effect (to very small values) which is produced by the mediocre qualities exhibited by a switching diode used as a switch in the "closed" state, that is to say in the "on" state. This is due, in particular, to a nonlinearity in the current/voltage characteristic of the diodes, in their mode of conduction in the forward direction. However, this solution which uses an optical flash to produce the drive charges, has the drawback of also producing a high degree of noise (associated with the optical flash).

The process of the invention has the advantage of making it readily possible to add drive charges, with the same aim as that intended in Patent Application No. 2 605 166, but by an electrical method which generates a much lower level of noise than an optical method.

BRIEF DESCRIPTION OF THE DRAWINGS

Other characteristics and advantages of the invention will become apparent on reading the following detailed description, given by way of nonlimiting example with reference to the appended drawings, in which.

DETAILED DESCRIPTION OF THE PREFERRED EMBODIMENTS

Figure 1:
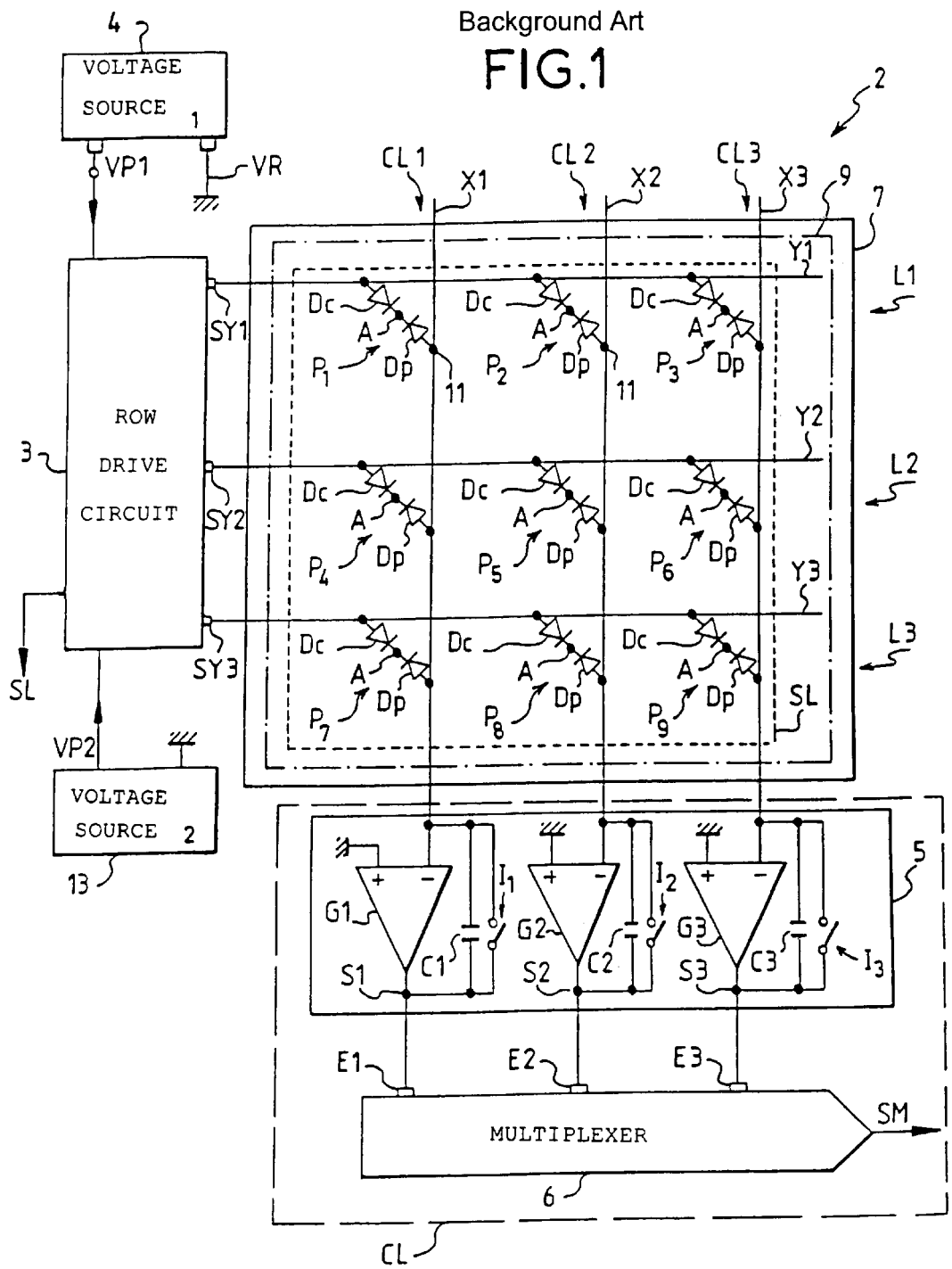
FIGS. 1 and 2 represent photosensitive devices to which the process of the invention may be applied.
Figures 3A, 3B, 3C, 3D, 3E:
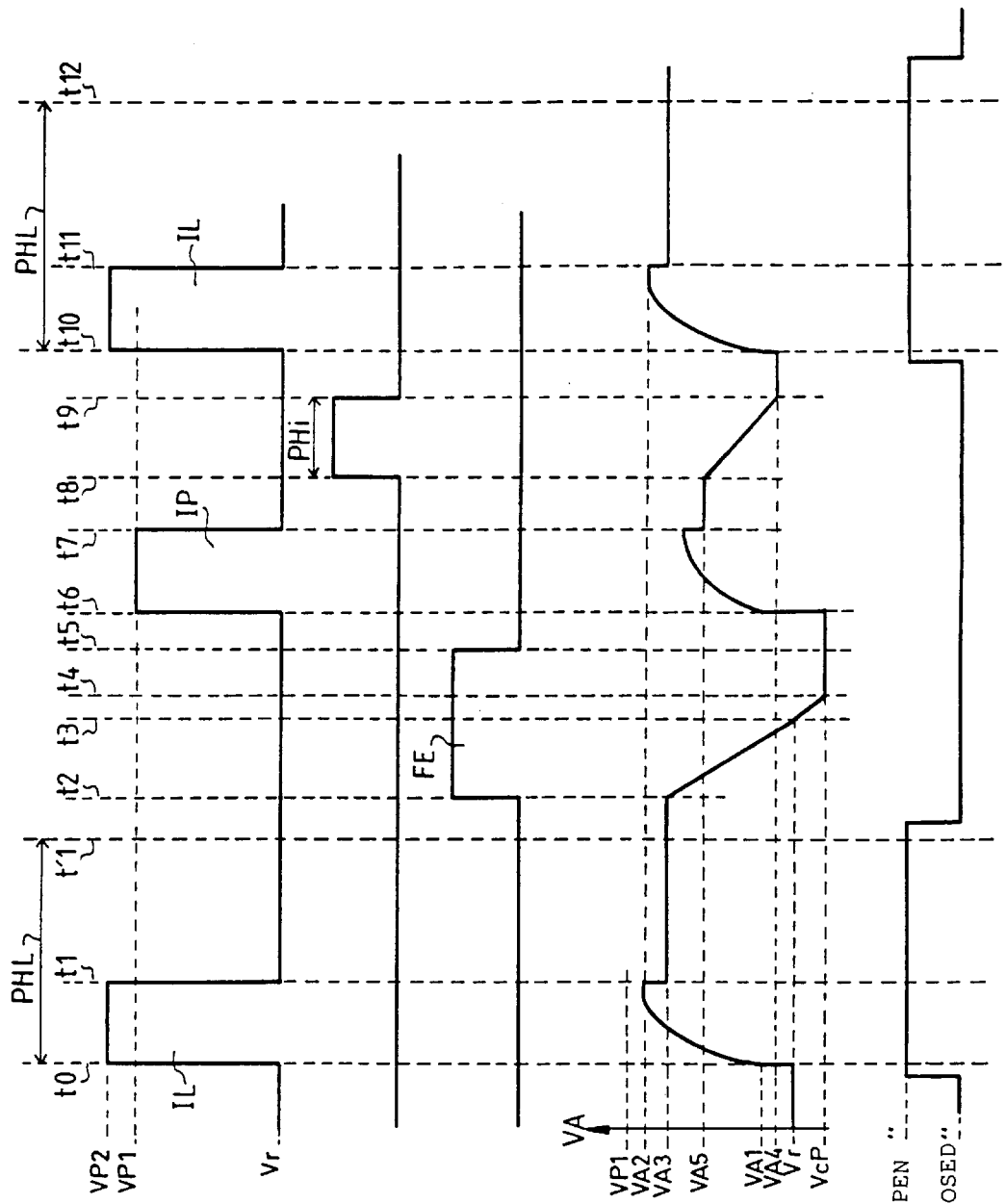
FIGS. 3a to 3e constitute a chronological diagram illustrating the operation of the devices in FIGS. 1 and 2, when being driven using the process of the invention.

Taking for example the photosensitive device in FIG. 1, each photosensitive point P1 to P9 of which has a switching diode Dc for fulfilling the switch function, FIG. 3a represents signals applied to a row conductor Y1 to Y3, for example the first conductor Y1; and FIG. 3d represents the variations in a voltage VA at the point "A" at floating potential of the photosensitive points, for example of the first photosensitive point P1.

In the nonlimiting example described, an operating cycle start lies after a time t1 which marks the end of a reading pulse IL applied to the first row conductor Y1. This reading pulse IL started at a time t0 of the start of a reading phase PHL of a preceding operating cycle, and made it possible to read the photosensitive points P1 to P3 exposed during an imaging phase of this preceding cycle.

In view of the conduction directions of the diodes Dc, Dp of each photosensitive point P1 to P9 in the example shown in FIG. 1, the reading pulse IL has a positive sign relative to the reference voltage VR, and an amplitude VP2. It sets the switching diode Dc in forward conduction, and the latter charges the capacitor constituted by the photodiode Dp: so that the voltage VA at the point "A" firstly changes to a value VA1 which corresponds to the elbow voltage of the switching diode Dc, then increases to a value VA2, substantially equal to VP2 less the value of the elbow voltage of the switching diode Dc. The charging of the capacitor formed by the photodiode Dp causes a current corresponding to the charges which are accumulated at the point "A" to flow on the column conductor X1.

At the time t1 when the reading pulse IL ceases, and when the voltage on the row conductor Y1 returns to the standby value, that is to say the reference voltage Vr, the switching diode Dc is set in reverse-bias and constitutes a capacitor: the voltage of VA at the point "A" decreases to a value VA3 by capacitive division.

Of course, all the row conductors Y1 to Y3 receive, one after the other, a reading pulse IL during this reading phase PHL which ceases at a time t1', and the profile of the variation in the voltage VA at the point "A" of the photosensitive points of all the rows L1 to L3 of the matrix 1 is similar to that described above.

According to one characteristic of the process according to the invention, a light flux FE which is referred to as the "erasing light flux" and is represented in FIG. 3c is applied to all the photosensitive points P1 to P9 of the matrix 2, before carrying out any imaging.

The erasing light flux FE is applied to all the photosensitive points P1 to P9, at a time t2 which follows the time t1' of the end of the reading phase of the preceding cycle. This erasing light flux must have an intensity and a duration which are sufficient for all the charges which it generates, which are accumulated at the points "A" at floating potential, to modify the voltage VA at these points "A" (and therefore the biasing of the photodiodes Dp) until the photodiodes Dp are set in conduction in their forward direction.

This effect of the application of the erasing flux FE appears in FIG. 3d, where it can be seen that, starting from time t2, the voltage VA varies (in a decreasing direction) until a time t3 when it reaches the reference voltage Vr, and when it changes sign to again increase to a value VcP (negative in the example represented) which corresponds to the elbow voltage of the photosensitive diode Dp. Starting from a time t4 when the value VcP corresponding to the elbow voltage of the photodiode Dp is reached, the later conducts a current in its forward conduction direction. Consequently, starting from time t4, the voltage VA at the point "A" substantially maintains the same value until a time t5 or the application of the erasing flux FE ceases and the current in the photodiode Dp also ceases.

The current corresponding to setting the photodiode Dp in conduction in the forward direction tends, as explained above, to saturate the "traps" which exist in the semiconductor material (for example aSiH), and thus tends to "erase" the traces of previous imaging and to avoid any correlation between this previous imaging and future imaging.

The light source making it possible to produce the erasing flux is in itself of a conventional type. It may consist for example of a light source such as the additional light source SL mentioned above, that is to say a lumiplate or of an array of light-emitting diodes, and it may also be arranged against the transparent substrate 7 (FIG. 1) on the opposite side from the matrix 2 (it should be noted that the light source SL could also be located on the same side as the matrix 1, so long as it does not interfere with correct exposure of the matrix 2 to the working light signal during imaging). The light source SL may be driven in a manner which is itself conventional, for example using a signal delivered by an output Ss1 of the row drive circuit 3 (FIG. 1). Of course, the photosensitive device in FIG. 2 may itself also have a light source SL (not shown in FIG. 2) arranged under the same conditions as explained above.

Referring again to FIGS. 3a to 3e, in order for the photosensitive points P1 to P9 to produce and accumulate charges during imaging, it is necessary to place the photodiodes Dp in the reverse-bias state. To that end, the process of the invention consists in applying a voltage pulse referred to as the biasing pulse IP (represented in FIG. 3a) to all the row conductors Y1 to Y3, having an amplitude VP1 which is positive relative to the reference voltage VR, that is to say having the same sign as the reading pulse IL.

A biasing pulse IP may be applied to all the row conductors Y1 to Y3 by the row drive circuit 3, either simultaneously to all these conductors, or row after row. What is necessary is for all the row conductors Y1 to Y3, and therefore all the photosensitive points P1 to P9, to receive the biasing pulse IP before the imaging phase.

At a time t6 when (FIG. 3a) a biasing pulse IP received by the first row conductor Y1 starts, the voltage VA at the point "A" of all the photosensitive points connected to this conductor changes sign and changes to the value VA1 which is the elbow voltage of the switching diode Dc. The latter is then returned to forward conduction and, the photodiode Dp then having returned to being reverse-biased, its capacitance is charged via the switching diode Dc: in consequence, the voltage VA increases until reaching, at a time t7 when the biasing pulse IP ceases, a value which corresponds to the amplitude Vp1 of this biasing pulse less the value of the elbow voltage of the switching diode Dc, in a way which in itself is comparable with the one already described with reference to the time interval between time t0 and time t1.

The process of the invention provides a very significant advantage, which resides in the possibility of creating drive charges in a simple way, and with high quality (low noise). It is sufficient to that end to give the biasing pulses IP an amplitude VP1 smaller than the amplitude VP2 of the reading pulses IL.

By way of explanation, assuming for example, that the voltage VA at the point "A" just before an imaging phase has the value VA3 displayed at time t1 (which would be the case if the biasing pulse IP had the same amplitude VP2 as the reading pulse IL), and assuming that this imaging does not bring about any illumination of the first photosensitive point P1, and if possible drifts and dark currents are not taken into account, the voltage VA at the point "A" will have kept the value VA3 after the imaging in consequence, the subsequent application of a reading pulse IL will not produce charging of the capacitor formed by the photodiode (when it is reverse-biased) and no charge will be transmitted on the corresponding column conductor, that is to say the first column conductor X1.

If, however, the amplitude VP1 of the biasing pulse IP is less than that VP2 of the reading pulse IL, at time t7 it gives the voltage VA at the point "A" before the imaging a value VA5 less than the value VA3 given by the reading pulse IL: consequently, with the application of a reading pulse IL, a current will be obtained on the first column conductor X1, which current will represent a so-called drive charge whose intensity will be proportional to the difference VA3–VA5.

These explanations show that a biasing pulse IP having an amplitude VP1 less than the amplitude VP2 of the reading pulse can generate drive charges whose value is dependent on the difference between the amplitudes VP1 and VP2.

The photosensitive device 1 in FIG. 1 may, with a view to creating drive charges, have a second voltage source 13 supplying the row drive circuit 3 with a voltage having the value of the amplitude VP1 of the biasing pulse IP; the voltage delivered by the first source 4 having, for example, the value of the amplitude VP2 of the reading pulse IL. The row drive circuit 3 can thus, in a manner which is known per se, select one or other of the two voltages and deliver it in the form of pulses to the row conductors Y1 to Y3 at appropriate times.

The drive charges may prove useful in cases, in particular, of low exposure values, especially for photosensitive points whose switch element is a diode, because of the nonlinearity in the current/voltage characteristic in forward mode which a diode exhibits.

Figure 2:
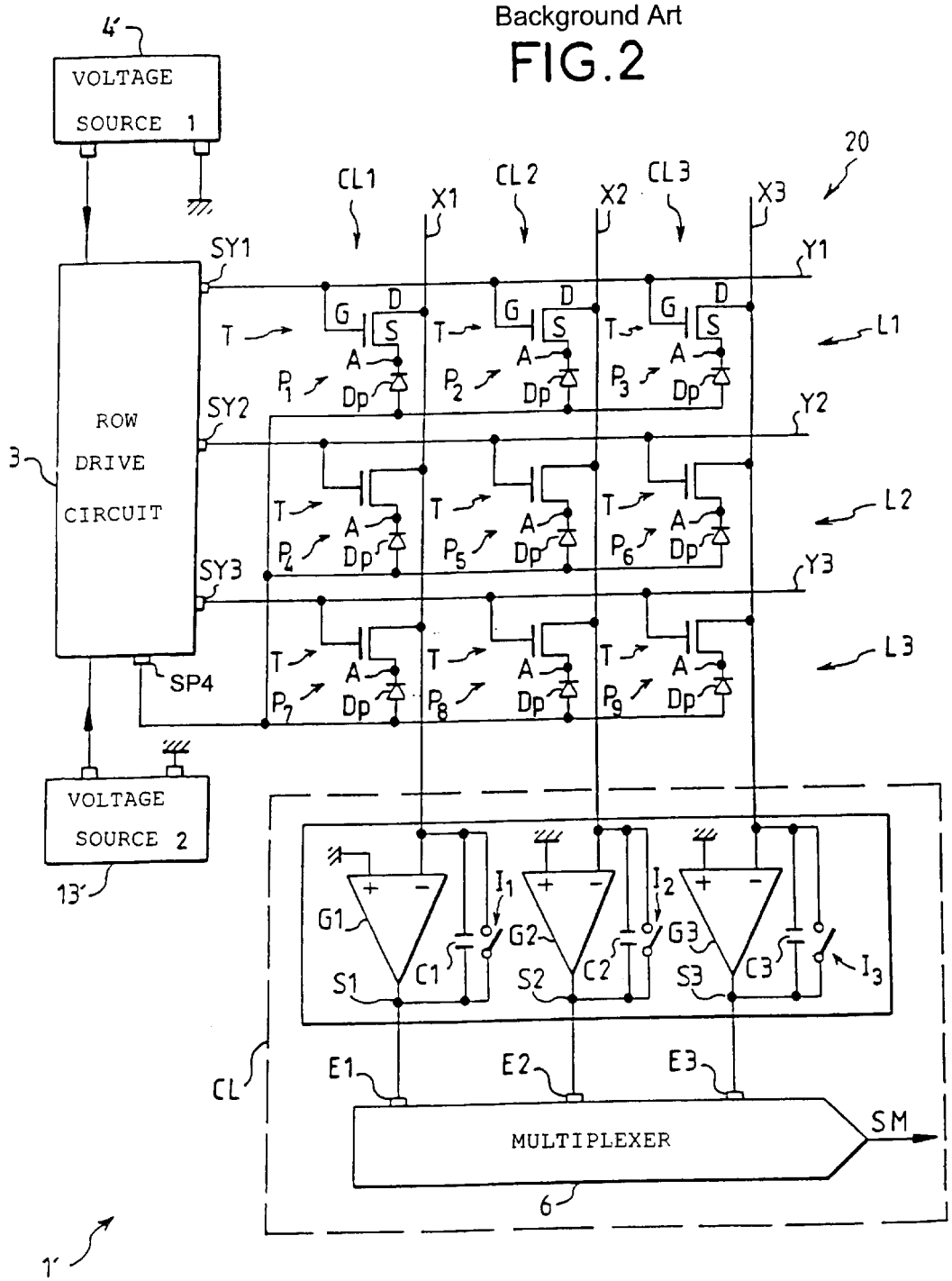

When it is not useful to use drive charges, for example with light signals having a high intensity, and when the switch element of the photosensitive points is a transistor, as in the case of the matrix 20 in FIG. 2, it is sufficient to give the biasing and reading pulses IP, IL the same amplitude in order to avoid producing these drive charges.

However, even in the case of the matrix 20 which uses transistors as the switch element, if these drive charges are necessary, the photosensitive device in FIG. 2 may itself also have a second voltage source 13', applying a second biasing voltage VpP, less than the first biasing voltage VpL, to the row drive circuit 3; the row drive circuit 3 can then select between the two voltages VpL and VpP the one which it is appropriate to apply via its output SP4, to the anodes of the photodiodes Dp, depending on whether the "on" state of the transistors T is being driven in order to accomplish initial biasing or for a reading phase.

Assuming (again in the case of the photosensitive device in FIG. 1) that the biasing pulse IP has the amplitude VP1 (the lower amplitude), the voltage VA at the point "A" keeps the value VA5 at least until a time t8 when an imaging phase, represented in FIG. 3b by a square wave Phi, takes place. If, from time t8 on, the photosensitive point P1 is subjected to illumination by a "working" light signal, the charges which are then produced and accumulated at the point "A" cause (as in the example represented in FIG. 3d) a decrease in the voltage VA at this point. This decrease is continuous (if the illumination is constant) and ceases at a time t9 which marks the end of the imaging phase. The voltage VA at the point "A" has, at this time, for example a value VA4 which is maintained until a time t10.

At time t10, a reading pulse IL is applied to the first row conductor Y1. It marks the start of a reading phase PHL used to read the charges which are produced in the imaging phase PH1. At the point "A", the profile of the variation in the voltage VA which is found is similar to that already described with reference to the time interval contained between times t0 and t1: the voltage VA changes to the value VA1 with the application of the reading pulse IL; then, the switching diode Dc being in a state to conduct, it charges the capacitor formed by the photodiode Dp, and this imposes a current on the column conductor X1; the voltage VA increases up to its maximum value VA2. At a time t11 when the reading pulse IL ends, the voltage VA changes to the value VA3 (as at time t1).

Reading pulses (not shown) are then applied successively to the row conductors Y2, Y3 during the rest of the reading phase PHL, the end of which takes place at a time t12.

FIG. 3e represents the "open" and "closed" states of the resetting switches I1, I2, I3, which switches allow the operation of integration by the amplifiers G1, G2, G3 only when they are in the "open" state. FIG. 3e illustrates the fact that the switches I1 to I3 are in the "open" state only during the reading phases PHL, and that in consequence only the currents flowing in the column conductors X1 to X3 during the reading phases are taken into account.

The various time intervals contained between t1' and t12 correspond to different steps in a complete operating sequence of a photosensitive device driven in accordance with the process of the invention. The end of the reading phase at time t12 marks the start of a possible subsequence operating sequence.

It should be noted that, if the residual remanence level that can be tolerated is very low, it is still possible to improve it by carrying out a plurality of erasing operations in a single operating sequence, that is to say that, between times t2 and t7, the photosensitive points P1 to P9 of the matrix may be exposed several times to the erasing light flux FE, each application of an erasing flux being followed by the application of a biasing pulse IP.

This description of the process of the invention has been given with reference to matrices 2, 20 having photosensitive points P1 to P9 whose switching diodes Dc and photodiodes Dp are connected with given conduction directions which are shown in FIGS. 1 and 2. However, the process of the invention can equally well be applied if these diodes Dc, Dp are connected with conduction directions opposite to those represented in these figures. To that end, it is sufficient to invert the sign of the reading pulses IL and of the biasing pulses IP, as well as of the biasing voltages.

The process of the invention is also applicable to the driving of photosensitive devices used for radiological image detection. These photosensitive devices then need to have a scintillator for converting incident radiation, in particular X-radiation, into light radiation in the band of wavelengths to which the photodiodes Dp are sensitive. Taking, for example, the device 1 shown in FIG. 1, such a scintillator may consist of a layer 9 (symbolized in FIG. 1 by a square in broken lines) of a scintillating substrate, for example cesium iodide (CsI); this scintillating layer 9 is arranged above the matrix 2, so as to be interposed between the latter and the incident X-radiation. The photosensitive device 1' in FIG. 2 may itself also have a scintillator screen 9 (not shown), arranged in the same way as that of the device in FIG. 1.

It should be noted that the process of the invention applies particularly advantageously in the case when the scintillator 9 is made of cesium iodide (CsI), because this scintillating substance is known for its very low intrinsic remanence. Coupling a cesium iodide scintillator to a matrix 2, 20 whose photodiodes Dp are made of hydrogenated amorphous silicon (aSiH), while being driven by the process according to the invention which eliminates the remanence inherent in the hydrogenated amorphous silicon, makes it possible of very high quality.

What is claimed is:

1. A drive process for a photosensitive device comprising a matrix of photosensitive points, the photosensitive points are arranged in at least one row and in at least one column and each photosensitive point of said photosensitive points comprises a switch element connected in series with a photodiode to have a common point, the drive process comprising:

exposing at least one photosensitive point of said photosensitive points of the matrix to an erasing light having an intensity and a duration such that a first plurality of charges generated in said at least one photosensitive point modify a voltage of said common point until said voltage of said common point reaches an elbow voltage of the photodiode and the photodiode conducts in a forward direction;

reverse-biasing said photodiode;

exposing said at least one photosensitive point to a light signal such that a second plurality of charges produced in said at least one photosensitive point by said light signal modify a bias voltage of said photodiode; and reading said at least one photosensitive point after said exposing.

2. The drive process according to claim 1, wherein the switch element is a switching diode.

3. The drive process according to claim 2, wherein a row conductor corresponds to said at least one row, a column conductor corresponds to said at least one column, and the switching diode and the photodiode of each photosensitive point of said photosensitive points is connected between said row conductor and said column conductor with opposite conduction directions.

4. The drive process according to claim 3, said reading comprising applying a biasing pulse to said row conductor, wherein the biasing pulse has a same sign as said reverse-biasing, and a first amplitude of said biasing pulse determines a value of said reverse-biasing; and said exposing said at least one photosensitive point comprising applying a reading pulse having a second amplitude and a same sign as the biasing pulse applied to said row conductor.

5. The drive process according to claim 4, wherein said first amplitude is equal to said second amplitude.

6. The drive process according to claim 4, wherein said first amplitude is smaller than said second amplitude.

7. The drive process according to claim 1, wherein the switch element is a transistor.

8. The drive process according to claim 7, wherein a row conductor corresponds to said at least one row, a column conductor corresponds to said at least one column, and the transistor is connected via a gate to said row conductor, via a source to a first end of said photodiode, and via a drain to said column conductor, and a second end of said photodiode receives said bias voltage that reverse-biases said photodiode.

9. The drive process according to claim 8, wherein a value of the bias voltage differs depending on whether the bias voltage is applied before said exposing or before said reading.

10. The drive process according to claim 1, wherein the photodiode comprises hydrogenated amorphous silicon.

11. The drive process according to claim 1, wherein the matrix is produced by thin-film deposition techniques.

12. The drive process according to claim 1, wherein the matrix is formed on a first face of an optically transparent substrate.

13. The drive process according to claim 12, wherein a light source is provided on a second face of said optically transparent substrate, opposite to said first face.

14. The drive process according to claim 1, wherein a scintillator screen is interposed between the matrix and an incident radiation on the matrix.

15. The drive process according to claim 14, wherein the incident radiation is X-radiation.

16. A photosensitive device comprising:

a matrix of photosensitive points that are arranged in at least one row and at least one column, each photosensitive point of said photosensitive points lying at an intersection of said at least one row and said at least one column, each photosensitive point comprising:
   a switch element, and
   a photodiode, wherein
      said switch element is formed in series with the photodiode,
      each photodiode is reverse-biased during an imaging phase,
      a junction between the photodiode and the switch element have a common point having a floating potential, and
      charges produced by the photodiode are accumulated at said common point;

a first voltage source configured to expose the matrix to an erasing light flux such that said photodiode produces charges that accumulate at said common point and causes said photodiode to conduct in a forward direction; and a second voltage source configured to reverse-bias said photodiode after an application of the erasing light flux and before the imaging phase, wherein said photosensitive device implements a process comprising:

exposing at least one photosensitive point of said photosensitive points of the matrix to the erasing light having an intensity and a duration such that a first plurality of charges generated in said at least one photosensitive point modify a voltage of said common point until said voltage of said common point reaches an elbow voltage of the photodiode and the photodiode conducts in a forward direction;

reverse-biasing said photodiode;

exposing said at least one photosensitive point to a light signal such that a second plurality of charges produced in said at least one photosensitive point by said light signal modify a bias voltage of said photodiode; and reading said at least one photosensitive point after said exposing.

17. The photosensitive device according to claim 16, wherein the second voltage source applies a biasing pulse to said at least one photosensitive point, said biasing pulse has a same sign as a reading pulse applied to said at least one photosensitive point during a reading phase which takes place after an imaging phase.

18. The photosensitive device according to claim 17, wherein the biasing pulse has an amplitude smaller than an amplitude of the reading pulse.

19. The photosensitive device according to claim 17, wherein the biasing pulse has an amplitude equal to an amplitude of the reading pulse.

20. The photosensitive device according to claim 16, wherein the switch element is a transistor.

21. The photosensitive device according to claim 16, wherein the switch element is a diode.

22. The photosensitive device according to claim 16, wherein the photodiode comprises hydrogenated amorphous silicon.

23. The photosensitive device according to claim 16, wherein the matrix is produced on a first face of a transparent substrate and a light source is provided on a second face of said transparent substrate, opposite said first face.

24. The photosensitive device according to claim 16, further comprising a scintillator screen converting X-radiation to light radiation in a band of wavelength to which said photodiode is sensitive.

* * * * *